US 8,150,465 B2

(12) United States Patent
Zhang et al.

(10) Patent No.: US 8,150,465 B2
(45) Date of Patent: Apr. 3, 2012

(54) ENVIRONMENTAL MONITORING USING MOBILE DEVICES AND NETWORK INFORMATION SERVER

(75) Inventors: Tao Zhang, Fort Lee, NJ (US); Sunil Madhani, Austin, TX (US); Raziq Yaqub, Stewartsville, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 0 days.

(21) Appl. No.: 12/568,983

(22) Filed: Sep. 29, 2009

(65) Prior Publication Data
US 2010/0090841 A1    Apr. 15, 2010

Related U.S. Application Data

(62) Division of application No. 11/419,575, filed on May 22, 2006, now Pat. No. 7,603,138.

(60) Provisional application No. 60/710,354, filed on Aug. 22, 2005.

(51) Int. Cl.
*H04B 1/38* (2006.01)

(52) U.S. Cl. .................. 455/557; 455/404.1; 455/426.1; 455/550.1; 340/531

(58) Field of Classification Search .................. 455/557, 455/404.01, 426, 550.1, 404.1, 550.11; 340/539, 340/531
See application file for complete search history.

(56) References Cited

U.S. PATENT DOCUMENTS

| 6,023,223 | A  | 2/2000  | Baxter, Jr.     |
|-----------|----|---------|-----------------|
| 6,405,135 | B1 | 6/2002  | Adriany et al.  |
| 6,437,692 | B1 | 8/2002  | Petite et al.   |
| 6,703,930 | B2 | 3/2004  | Skinner         |
| 7,019,652 | B2 | 3/2006  | Richardson      |
| 7,603,138 | B2 | 10/2009 | Zhang et al.    |
| 2006/0007001 | A1 | 1/2006 | Rastegar et al. |
| 2007/0088634 | A1 | 4/2007 | Matsumoto et al.|

OTHER PUBLICATIONS

Supplementary European Search Report dated Jun. 29, 2010, issued in corresponding European Patent Application No. 06802106.2.
RDF Primer (Resource Description Framework), http:l/wvvw.w3.org/TR/rdf-primer, W3C, Feb. 2004, p. 1-112, USA.
SOAP Version 1.2 Part 1: Messaging Framework (Simple Object Access Protocol), http://www.w3.org/TR/soap 12, W3C, Apr. 2007, p. 1-53, USA.
F. Van Wijland et al., "Topology of the support of the two-dimensional random walk", Journal of Physics, A, vol. 30, p. 507, 1997.
"Next Century Challenges: Scalable Coordination in Sensor Networks" Deborah Estrin, Ramesh Govindan, John Heidemann, Satis Kumar, Proceedings of MOBICOMM 1999, pp. 263-270.

*Primary Examiner* — Yuwen Pan
(74) *Attorney, Agent, or Firm* — Westerman, Hattori, Daniels & Adrian, LLP

(57) ABSTRACT

Sensors mounted on vehicles (e.g., buses, taxis, police cars) and public personnel (e.g., policemen) are used to monitor various conditions and situations such as air quality, potential biological and chemical attacks, and road and traffic conditions. The invention improves upon the typical approach that deploys fixed sensors at every geographical position of interest. The total number of required sensors and the size and the complexity of the network infrastructure required to connect the sensors are reduced and simplified. A method for estimating the number of mobile sensors required to cover a region of interest also is disclosed. A relatively small number of mobile sensors may be sufficient to cover a large area at a lower cost and less complexity than a fixed sensor network.

17 Claims, 3 Drawing Sheets

Sorting and Reporting Environmental Data to the Knowledge Server based on Urgency/Necessity

Sorting and Reporting Environmental Data to the Knowledge Server based on Urgency/Necessity

FIG. 4

ENVIRONMENTAL MONITORING USING MOBILE DEVICES AND NETWORK INFORMATION SERVER

The present application is a divisional application of U.S. Ser. No. 11/419,575, filed on May 22, 2006, which claims priority to U.S. provisional application Ser. No. 60/710,354, filed on Aug. 22, 2005, entitled Sensors On Patrol (SOP): Using Mobile Sensors for Environmental Monitoring, to Tao Zhang, et al., the entire disclosures of which two applications are both incorporated herein by reference.

BACKGROUND

1. Field of the Invention

The present application relates generally to wireless networking, and more particularly to systems and methods for supporting the use of mobile devices as sensors to detect various types of environmental conditions and situations, such as weather and traffic conditions, as well as potential biological, chemical or other types of hazards, together with advanced handover (handoff) operations whereby such mobile devices may connect to different wireless networks and/or wireless network access points as needed to maintain continuity of connectivity of the mobile sensor devices with a host control or command center.

2. General Background Discussion

A. Environmental Monitoring

Environmental sensors have been developed to monitor conditions such as potential biological and chemical attacks, air quality, road conditions, traffic accidents, and so on. For example, flame detectors monitor and analyze incident radiation at selected wavelengths to determine the existence of a fire. Humidity sensors test for absolute humidity, relative humidity, or dew point in air. Moisture sensors are used to measure the moisture content in gases. Photometers and colorimeters, water quality sensors, are ion-specific computer-interfaced probes designed to determine the concentration of a solution from its color intensity. Radiation sensors are used for medical diagnoses, radioactive dating measurements, and measurements of background radiation, activity levels and radiation doses. Smoke detectors (e.g., ionization chambers and photoelectric smoke detectors) are designed to sense the products of combustion. Solar radiation sensors measure the spectral range of radiation, including global solar radiation, net solar radiation and the photosynthetic light spectrum. Temperature sensors are used to measure the temperature. UV sensors are used to detect ultraviolet power or intensity. Opacity sensors, dust sensors and visibility sensors measure the amount of light transmitted through a sample. Weather sensors are designed to measure one or multiple components of weather including wind speed and direction, rain or snow fall, solar radiation, temperature, pressure and humidity.

Many cities are deploying or considering the deployment of sensors to monitor the environment. Today, a typical approach is to deploy fixed sensors at selected geographical positions of interest. This works well when each sensor can sense a large geographical area. However, many environmental sensors can typically sense only a small area. As a result, a large number of fixed sensors are needed to cover a large city. This also means that a large and complex network infrastructure is required to connect all the sensors to monitoring centers. Furthermore, fixed sensors are prone to tampering. Accordingly, there exists a need in the art for improvement in environmental monitoring and reporting.

B. Wireless Networks

Wireless networks can incorporate a variety of types of mobile devices, such as cellular and wireless telephones, PCs (personal computers), laptop computers, wearable computers, cordless phones, pagers, headsets, printers, PDAs (personal digital assistants), etc. Mobile devices may include digital systems to secure fast wireless transmissions of voice and/or data.

Wireless LANs (WLANs) in which a mobile user can connect to a local area network (LAN) through a wireless connection may be employed for wireless communications. Wireless communications can include communications that propagate via electromagnetic waves, such as light, infrared, radio, microwave. There are a variety of different WLAN standards that currently exist, such as Bluetooth, IEEE 802.11, and HomeRF.

For example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

Similarly, IEEE 802.11 specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

Wireless networks also may involve methods and protocols found in Mobile IP (Internet Protocol) systems, in PCS systems, and in other mobile network systems. With respect to Mobile IP, this involves a standard communications protocol created by the Internet Engineering Task Force (IETF). With Mobile IP, mobile device users may move across networks while maintaining their IP Address assigned once. See Request for Comments (RFC) 3344. Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address by using a protocol such as Internet Control Message Protocol (ICMP).

In basic IP routing, routing mechanisms typically rely on the assumptions that each network node always has a constant attachment point to the Internet and that each node's IP address identifies the network link it is attached to. In this document, the terminology "node" includes a connection point, which can include a redistribution point or an end point for data transmissions, and which can recognize, process and/or forward communications to other nodes. For example, Internet routers can look at an IP address prefix or the like identifying a device's network. Then, at a network level, routers can look at a set of bits identifying a particular subnet. Then, at a subnet level, routers can look at a set of bits identifying a particular device. With typical mobile IP communications, if a user disconnects a mobile device from the Internet and tries to reconnect it at a new subnet, then the device has to be reconfigured with a new IP address, a proper netmask and a default router. Otherwise, routing protocols would not be able to deliver the packets properly.

C. Handovers (Handoff) of Mobile Devices

In the context of a mobile device with an IP-based wireless network interface, the mobile device needs to perform roaming or handovers when it moves from one network to another network, or from one access point of a network to another, in order to maintain session continuity, thus making it imperative for a mobile device to find immediately an appropriate point of network attachment and remain connected to ensure session continuity. With existing handover methodologies, handover is typically accomplished by performing the following sequence of protocol layer specific handovers:

First, handover takes place at the physical layer. In this regard, the mobile device switches its radio channel to a wireless base station or wireless access point in the target network.

Second, handover takes place at layer-2. In this regard, the mobile device switches its layer-2 (i.e., link-layer) connections to the target network. As explained above, the link layer or layer-2 refers to the protocol immediately below the IP-layer that carries user traffic. The mobile device performs layer-2 authentication with the target network if the target network requires such authentication.

Third, handover takes place at the IP-layer. In this regard, the mobile device obtains a local IP address from the target network, performs IP-layer authentication if required by the target network, and then performs IP-layer location update so that IP packets destined to the mobile device can be routed by the IP network to the mobile device via the target network. In some instances, one way to support IP layer location update is to use Mobile IP defined by the Internet Engineering Task Force (IETF).

Fourth, handover takes place at the application-layer. The mobile device performs necessary steps at the application layer to ensure that its application traffic will flow correctly to the applications on the mobile device via the target network. For example, when the mobile device uses the Session Initiation Protocol (SIP) defined by the IETF to manage its application-layer signaling, an application layer handover can be achieved by the mobile device updating its current location with its home SIP server. The mobile device may also need to carry out application-layer authentication with the target network if required by the target network. This is the case, for example, when the mobile device is using the IP Multimedia Subsystem (IMS) in a visited 3GPP ($3^{rd}$ Generation Partnership Project) wireless network, where the IMS is a SIP-based system supporting application-layer signaling and management for multimedia applications over 3GPP networks.

D. Network Discovery, Media Independent Information Servers, and Handovers

Network Discovery refers to the identification of an appropriate point of network attachment that meets the application requirements and the characteristics of the mobile device, in a timely, accurate and efficient manner. It is important for the mobile device to obtain this network information before it becomes necessary to carry out a handover or connectivity transfer operation. Network information is any information that is used by a mobile device for identifying networks, accessing networks, and seamlessly transitioning from one network connection to another. The mobile device's network connections may be homogeneous (e.g., access points belonging to the same network) or heterogeneous (e.g., access points belonging to different networks). With the proliferation of wireless network service providers, seamless handover across heterogeneous networks is becoming as important as handover between homogeneous networks. However, heterogeneous handover requires the following key capabilities:

Quick Network Discovery: To discover the most up-to-date and accurate information about the existence and availability of networks and information regarding the networks to which the mobile device may connect in a handover operation.

Quick Selection of Candidate Networks: To quickly select one network that the mobile device will prefer to use, when multiple networks are available at the same time.

With Network Discovery, Proactive Handover Actions can be enabled. Proactive handover actions refer to performing some or all of the required handover actions before the mobile device is actually handed over to a target network to reduce delay and possible session discontinuity. For example, the mobile device may pre-acquire a local IP address and perform pre-authentication with a target network while still connected to a first network, so that when the time comes for the handover, the mobile is already assigned a valid IP address and already is authenticated with the target network.

SUMMARY OF THE PREFERRED EMBODIMENTS

The preferred embodiments of the present invention fulfill the existing need as explained above, by providing systems and methods for environmental monitoring and detection by using mobile sensors to patrol an area of interest and relay collected data substantially in real time to a command center. According to one aspect of the present invention, mobile sensors are mounted on public vehicles (e.g., buses, taxis, police cars, trains, trucks) and are worn or carried by public personnel (e.g., policemen, fire fighters, mail carriers, emergency response personnel) to monitor the environment. A vehicle or person that carries a mobile sensor will be referred to as a Sensor Carrier. The mobile sensors or the Sensor Carriers can be equipped with geographical location determination devices (e.g., the Global Positioning System or GPS) so that they can map the environmental data collected to geographical locations.

The Mobile Sensor System (MSS) can co-exist with fixed sensors. MSS can be used to monitor areas which are frequently traveled by Sensor Carriers and fixed sensors can be used only in areas where few vehicles and/or people travel to or sub-areas which cannot be easily sensed by vehicle-mounted or wearable sensors.

MSS can reduce the number of sensors required to cover a given geographical area, and also reduce the size and complexity of the network infrastructure for connecting sensors to monitoring command centers. Rather than having to connect a large number of fixed sensors over a potentially large geographical region, a smaller number of wireless local-area networks (WLANs), such as those using IEEE 802.11 (WiFi) or IEEE 802.16 (WiMax), can be established in selected locations in the region of interest for the mobile sensors to report the information they collected to monitoring centers when these mobile sensors move through the WLANs.

In conjunction with the mobile sensing of environmental conditions and situations, it is important to have information about neighboring wireless networks that a mobile user may enter so as to enable a mobile sensor device to implement advanced capabilities to better support mobility and mobile applications. For example, knowing the addresses of the address servers and the authentication servers in a neighboring network may allow a mobile sensor device to acquire a local Internet protocol address from, and authenticate with, the neighboring network before the mobile actually enters the radio coverage area of the neighboring network. This can significantly reduce handover delays. In other words, to support such proactive handover mechanisms, the mobiles need to be able to discover the neighboring networks and their parameters ahead of time. This can be achieved if, for example, other communications devices that previously visited the networks reported the information they collected to a Knowledge Server (such as a MIIS as described above) so that any mobile device can later query such Knowledge Server to find the information about the neighboring networks at their current locations.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DETAILED DESCRIPTION OF THE PREFERRED EMBODIMENTS

In accordance with one aspect of the present invention, advantage is taken of the natural mobility of vehicles and people that routinely move throughout a geographical region by supplying such vehicles and/or people with mobile sensors as they move about in such regions. A vehicle or person that carries a Mobile Sensor will be referred to as a Sensor Carrier.

The term "sensor" in this document is used in its most general sense. Any type of sensors may be used. These include, for example, sensors that can be used to detect potential nuclear, biological, chemical or other types of airborne hazards. Any communication device may be used as a sensor to collect (i.e., "sense") information about the networks they visit. Such information may include the location, type, capabilities of networks, network elements (e.g., wireless access points, routers, IP address servers, network authentication servers, and application servers), and their properties (e.g., addresses and information needed to access these network elements). They can also collect user information contents available on the networks. The mobile devices can map the network information they collected to geographical coordinates and report the information to the Knowledge Server. Specially designed "network sensors" can also be mounted on mobile vehicles or carried by people and used to collect the network information described above.

Figure 1:
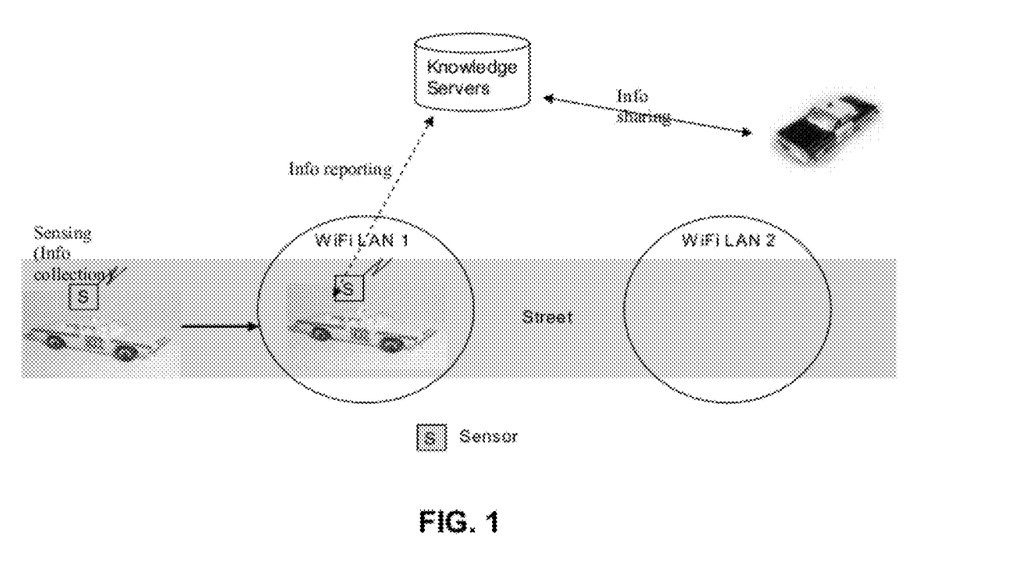
FIG. 1 is a schematic diagram of one embodiment of a mobile sensor device system according to the invention, utilizing multiple "roadside" wireless LANs.

Referring to FIG. 1, monitoring the environment along a city street is shown as an example to illustrate the principles and operations of the invention. In one preferred embodiment, mobile sensors monitor the area of interest (e.g., a street), as the Sensor Carriers move about. For example, as taxis move down a street, sensors mounted on the taxis monitor their surroundings continuously. Sensors report the information they collect to a processing center, for example to a Knowledge Server as shown in FIG. 1. Users, such as policemen, emergency management personnel, and environmental monitoring agencies can then query the Knowledge Servers for information collected from the sensors. Users and computer programs can also query the mobile sensors directly over wireless networks.

A small number of wireless LANs, such as WiFi LANs (IEEE 802.11), can be deployed at selected locations and positions along a street to be used by the mobile sensors to transmit their collected data. Key factors that impact the number of required wireless LANs include the required sensor information reporting frequency, the size of the geographical area to be monitored, and the velocity and mobility patterns of the Sensor Carriers inside the area. The frequency with which a sensor reports its findings depends on the requirements of the specific applications that use the sensor data. Depending on the required sensor information reporting frequency, the wireless LANs may not need to cover the entire street and a sensor may or may not need to report its findings at every roadside WiFi LAN it traverses.

The roadside wireless LANs can also be used for a processing center to support other mobile sensor-based networking capabilities and applications, such as:

Remote configuration of the sensors. For example, the frequency with which sensors report information can be changed, and selected sensors can be turned on or off remotely;

Proactively polling the mobile sensors that pass through a wireless LAN to collect sensor data;

Sending alerts to vehicles and people who pass through the wireless LANs based on sensor the collected sensor information.

One important issue in accordance with the MSS of the present invention is how many Sensor Carriers will be required in a given geographical area so that each position of interest in the region can be sensed at a minimum required frequency, which will be referred to as the required Sensing Frequency. One approach according to the invention for determining the minimum number of sensor carriers needed to meet a given sensing frequency for a given geographical region is based on the observation that it is generally easier to determine the number of Sensor Carriers required to cover a small and regular area than a large and random area. Therefore, one basic approach is as follows:

Step 1: Decompose the original, and potentially large, geographical region of interest such as a city, into n smaller sub-areas so that:

The number K of Sensor Carriers required to meet the sensing frequency inside each sub-area can be easily determined, and The value of K is roughly identical for each sub area.

Step 2: Compute the value of K for each sub-area.

Step 3: Compute the minimum number S(n) of Sensor Carriers required so that there will be at least one sensor carrier inside each sub-area.

Step 4: The minimum total number S of Sensor Carriers required to meet the required sensing frequency in all sub-areas can then be computed as S=K*S(n).

Methods for estimating the value of K and for estimating S(n) will now be described.

A. Methods for Determining the Value of K

This section first describes methods for estimating the number K of sensor carriers required to meet the sensing frequency for each sub-area. It then discusses how to estimate the number W of wireless LANs required to be deployed inside the sub-area to meet a given sensor information reporting frequency.

The decomposition of a given region into n sub-areas so that each sub-area will need roughly the same number K of sensor carriers generally depends on factors that are specific to the given geographical region. For example, it may depend on how frequently each area within the given region is traveled by the potential Sensor Carriers.

Figure 2:
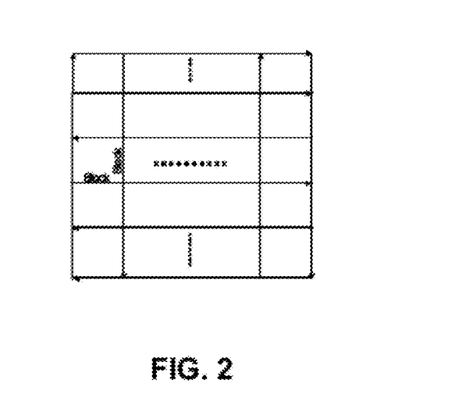
FIG. 2 is a schematic diagram illustrating one method of dividing a geographic region of interest into a plurality of sub-areas for sensor coverage calculations.

Using Manhattan, which is part of New York City, as an example, FIG. 2 illustrates how to decompose the given region and how to compute the value of K. As shown in FIG. 2, Manhattan is naturally divided into streets that go east and west and avenues that go north and south. The section of each street between two adjacent avenues, and the section of each avenue between two adjacent streets, is called a block.

To determine the number of Sensor Carriers needed to cover Manhattan, the blocks can be treated as sub-areas. Alternatively, we can treat the streets and avenues as the sub-areas. Given the traffic conditions in Manhattan, one can estimate the average time it may take a vehicle to traverse a sub-area. In Manhattan, the street blocks are typically between 250 to 300 meters long and the avenue blocks are much shorter. Hence, given average vehicle speeds, one can estimate the time it takes for a vehicle to traverse a block.

We denote by $\Delta$ the average sensing interval, which is the inverse of the sensing frequency, for each specific point of interest inside a sub-area. If T is the average time in minutes it takes one Sensor Carrier to traverse a sub-area, the average sensing interval $\Delta$ for each point of interest inside a sub-area will be T minutes when only one sensor carrier roams inside the sub-area. With K sensors in a sub-area, the average sensing interval $\Delta$ for the sub-area can be estimated as $\Delta \cong T/K$. Therefore, for a given target sensing interval $\Delta$ and the value of T, we can easily derive the value of K.

Assume that K sensor carriers are roaming randomly inside a sub-area. For a given sensor information reporting frequency $F_r$ (in number of reports per minute), the number W of required wireless LANs in the sub-area can be estimated as $W \cong T*F_r/K$.

B. Methods for Estimating S(n)

A method for estimating S(n), the minimum number of sensor carriers needed so that there will be at least one sensor carrier in each of the n sub-areas, will now be described. We assume that at any given time all Sensor Carriers are distributed in the n sub-areas uniformly at random. Then, the problem becomes one of determining the minimum number S(n) of balls one has to throw randomly into n urns before each urn contains at least one ball. The balls correspond to the Sensor Carriers and the urns correspond to the n sub-areas.

Let S(j) be the minimum number of sensor carriers required so that at least one sensor carrier will be in each of j sub-areas. Suppose that a minimum of M(j) additional sensor carriers will be needed so that one new sub-area will have at least one sensor carrier. Then we have, $$S(n) = S(n-1) + M(n-1)$$
$$S(n-1) = S(n-2) + M(n-2)$$
$$\vdots$$
$$S(2) = S(1) + M(1)$$
$$S(1) = 1$$

The probability that one additional Sensor Carrier will be sufficient for the value of M(j) to be 1 will be 1/n. The probability that only the second additional sensor carrier can make the value of M(j) to be 1 will be (1−1/n)(1/n). The probability that only the third additional sensor carrier can make the value of M(j) to be 1 will be (1−1/n)(1−1/n)(1/n), and so on. Therefore, M(n−1) can be calculated as follows $$M(n-1) = 1\frac{1}{n} + 2 \cdot \frac{n-1}{n} \cdot \frac{1}{n} + 3\left(\frac{n-1}{n}\right)^2 \frac{1}{n} + 4\left(\frac{n-1}{n}\right)^3 \frac{1}{n} + \ldots$$
$$= \frac{1}{n}\left\{ 1 + 2\left(\frac{n-1}{n}\right) + 3\left(\frac{n-1}{n}\right)^2 + 4\left(\frac{n-1}{n}\right)^3 + 5\left(\frac{n-1}{n}\right)^4 + \ldots \right\}$$
$$= \frac{1}{n}n^2 = n$$

Similarly, we can derive that:

$$M(k) = 1\frac{n-k}{n} + 2\left(\frac{k}{n}\right)\left(\frac{n-k}{n}\right) + 3\left(\frac{k}{n}\right)^2\left(\frac{n-k}{n}\right) + 4\left(\frac{k}{n}\right)^3\left(\frac{n-k}{n}\right) + \ldots$$
$$= \left(\frac{n-k}{n}\right)\left\{ 1 + 2\left(\frac{k}{n}\right) + 3\left(\frac{k}{n}\right)^2 + 4\left(\frac{k}{n}\right)^3 + \ldots \right\}$$
$$= \frac{n}{n-k}$$

S(n) can be derived as follows:

$$S(n) = \frac{n}{n-1} + \frac{n}{n-2} + \frac{n}{n-3} + \frac{n}{n-4} + \ldots + n \qquad (1)$$

$$= n\left(1 + \frac{1}{2} + \frac{1}{3} + \ldots + \frac{1}{n-1}\right)$$

Based on Equation (1), S(n) can be estimated as in Equation (2) when n is very large, $$S(n) \leq n \lg(n) \qquad (2)$$

When n is large, the problem of determining the number of Sensor Carriers required so that there will be at least one sensor carrier in every sub-area can also be modeled as the so-called Coupon Collector's Problem. The Coupon Collector's Problem can be formulated as follows: given n bins, how many coupons S(n) on average do we have to throw into the n bins before each bin contains at least one coupon? The n bins correspond to the n sub-areas in our problem and the S(n) balls correspond to the total number of Sensor Carriers needed so that there will be at least one Sensor Carrier monitoring each of the n sub-areas. Formulating the problem in this manner also leads us to the same conclusion as in Equation (2).

Figure 3:
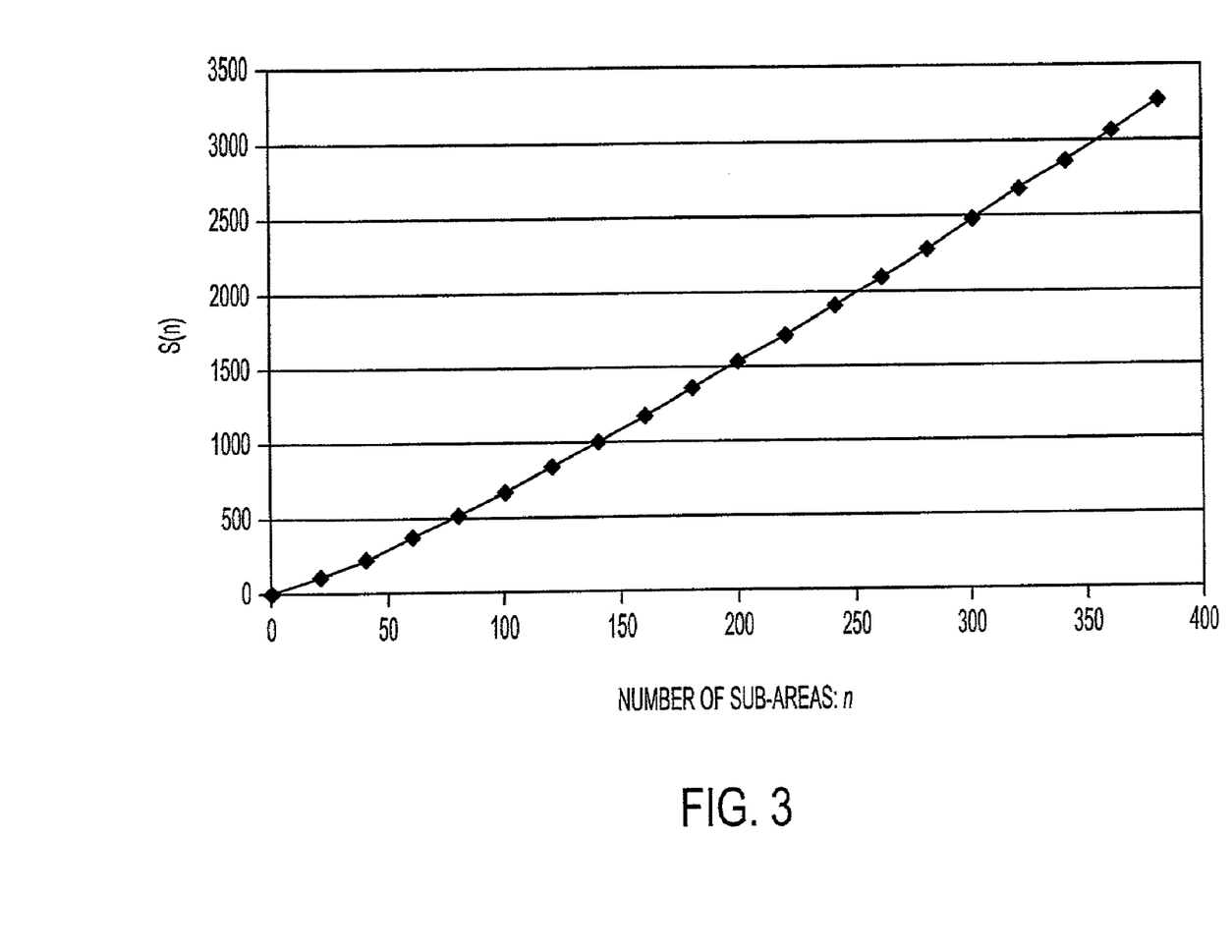
FIG. 3 is a graph showing the number of mobile sensors needed as a function of the number of sub-areas into which a region of interest is divided.

FIG. 3 shows S(n) vs. n for n up to 400. We observe from this figure that if at least one Sensor Carrier is required to be in each of n sub-areas in order to meet the sensing requirement in the sub-areas, a relatively small number of Sensor Carriers will be sufficient for a fairly large number of sub-areas. For example, less than 2450 Sensor Carriers will be sufficient for 300 sub-areas. Taking Manhattan again as an example, the number of taxis alone that roam the approximately 300 streets and avenues are far more than 2450 (there are about 13,000 taxis in New York City, and most of them are in Manhattan).

C. Data Processing

Figure 4:
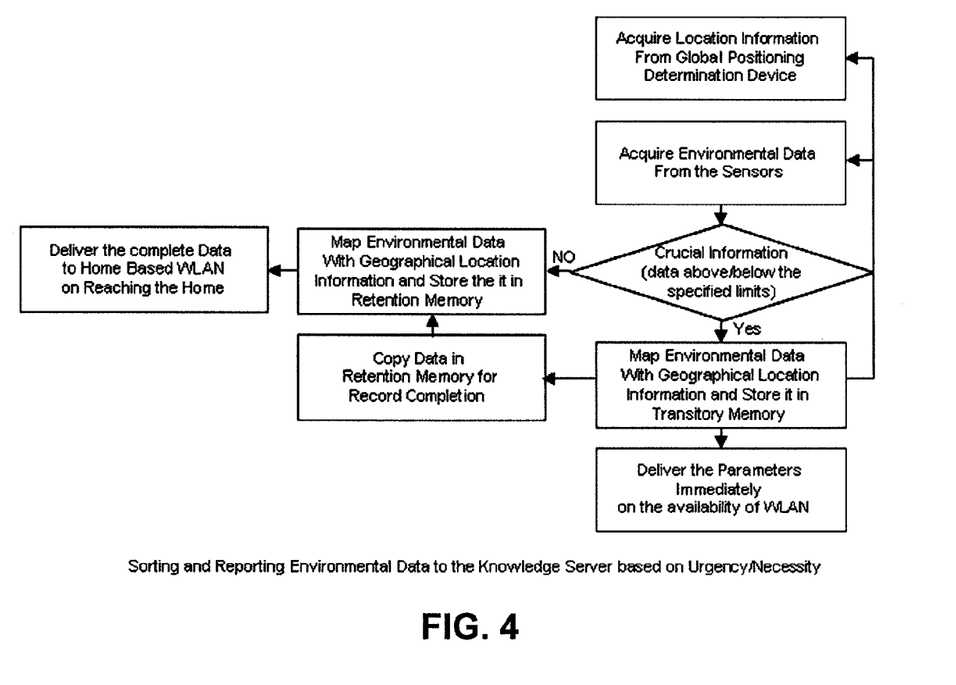
FIG. 4 is a flow diagram of an algorithm according to one aspect of the invention that sorts collected environmental data from the mobile sensor devices into critical data and stable data categories.

In another embodiment of the present invention, as referred in FIG. 4, a sorting algorithm will sort out the environmental data obtained continuously through the sensors into two categories, which will be given different priorities when the mobile sensors and Sensor Carriers have limited wireless network resources or time to report the data:

a) Critical Data: Data that lies below or above the standards set by Environmental Protection Agency (EPA) and is absolutely necessary to be conveyed to the knowledge server on real time basis;

b) Stable Data: That lies within normal range as specified by EPA and is not necessary to be communicated to the knowledge server on real time basis.

The critical data will be stored in a Transitory Memory and reported to the Knowledge Server immediately through the first WLAN that becomes available on the movement path of the Sensor Carrier. However, the stable data will be stored in a Retention Memory and will be uploaded to the server when the Sensor Carrier still have time and wireless resources after it finishes reporting the critical data or when the Sensor Carrier returns to its home WLAN. The data, if it lies beyond a tolerance limit and needs immediate action can also be routed automatically to an appropriate emergency center based on the geographical location information appended with the data.

This embodiment will further reduce the number of required wireless LANs deployment because the required sensor information reporting frequency will be reduced.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

The invention claimed is:

1. A system for monitoring various environmental conditions and situations, the system comprising:
a plurality of mobile sensor devices, each including at least one environmental sensor for detecting external environmental conditions such as potential biological or chemical attack, road and traffic conditions, air quality, weather conditions, and the like, said plurality of mobile sensor devices being mounted to respective sensor carriers deployed in a region of interest and roaming throughout said region of interest; and
a knowledge server in communication with said plurality of mobile sensor devices over a distributed wireless communication network, said knowledge server receiving sensor data developed by said plurality of mobile sensor devices over said distributed wireless communication network;
wherein at least one of said plurality of mobile sensor devices is mounted to a vehicle; and
wherein said plurality of mobile sensor devices report said sensor data to said knowledge server via a plurality of wireless local area networks (WLANS), said plurality of mobile sensor devices handling non-crucial information by transmitting sensor data to the knowledge server via a home based WLAN of the respective mobile sensor device when it returns to its home WLAN and handling crucial information by transmitting sensor data to the knowledge server via an available WLAN to which the respective mobile sensor device connects.

2. The system of claim 1 further including said plurality of mobile sensor devices being remotely configured via at least one WLAN to change frequency of its reporting and/or to turn it on/off.

3. The system of claim 1, wherein at least one of said plurality of mobile sensor devices is carried by a person.

4. The system of claim 3, wherein said person is selected from the group consisting of a police officer, a fire fighter, an emergency response personnel and a mail carrier.

5. The system of claim 1, wherein said distributed wireless communication network comprises a plurality of wireless Local Area Networks (LANS) connected to the Internet.

6. The system of claim 5, wherein the plurality of wireless LANS connected to the Internet are deployed at selected locations to receive the sensor data and send the sensor data to the knowledge server.

7. The system of claim 1,
wherein said distributed wireless communication network comprises a plurality of wireless Local Area Networks (LANS) connected to the Internet;
wherein the plurality of wireless LANS connected to the Internet are deployed at selected locations to receive the sensor data and send the sensor data to the knowledge server; and
wherein the number of wireless LANs required in said region of interest is calculated based on a number of mobile sensor devices deployed in said region of interest, a frequency of sensor information reports transmitted by said mobile sensor devices, and a time required for a mobile sensor device to traverse said region of interest.

8. The system of claim 1, wherein said vehicle is selected from the group consisting of a bus, a taxi, a police vehicle, a truck, and a train.

9. The system of claim 1, wherein said mobile sensor devices report said sensor data geographically mapped.

10. A method of detecting a variety of environmental conditions and situations, the method comprising the steps of:
providing a plurality of mobile sensor devices mounted to respective sensor carriers deployed for roaming within a region of interest, wherein each mobile sensor device is connectable to a central knowledge server over a distributed wireless communication network, each mobile sensor device being equipped with a sensor that is capable of detecting at least one of a plurality of external environmental conditions such as potential biological or chemical attack, road and traffic conditions, air quality, weather conditions, and the like;
providing at least one central knowledge server that receives sensor data developed by said plurality of mobile sensor devices in a periodic transmission from mobile sensor devices over said distributed wireless communication network;
wherein at least one of said plurality of mobile sensor devices is mounted to a vehicle; and
wherein said plurality of mobile sensor devices report said sensor data to said knowledge server via a plurality of wireless local area networks (WLANS), said plurality of mobile sensor devices handling non-crucial information by transmitting
sensor data to the knowledge server via a home based WLAN of the respective mobile sensor device when it returns to its home WLAN and handling a crucial information by transmitting sensor data to the knowledge server via an available WLAN to which the respective mobile sensor device connects.

11. The method of claim 10, further including said plurality of mobile sensor devices being remotely configured via at least one WLAN to change frequency of its reporting and/or to turn it on/off.

12. The method of claim 10, wherein at least one of said plurality of mobile sensor devices is carried by a person.

13. The method of claim 12, wherein said person is selected from the group consisting of a police officer, a fire fighter, an emergency response personnel and a mail carrier.

14. The method of claim 10, wherein said vehicle is selected from the group consisting of a bus, a taxi, a police vehicle, a truck, and a train.

15. The method of claim 10, wherein said mobile sensor devices report said sensor data geographically mapped.

16. A method of detecting a variety of environmental conditions and situations, the method comprising the steps of:
providing a plurality of mobile sensor devices mounted to respective sensor carriers deployed for roaming within a region of interest, wherein each mobile sensor device is connectable to a central knowledge server over a distributed wireless communication network, each mobile sensor device being equipped with a sensor that is capable of detecting at least one of a plurality of external environmental conditions such as potential biological or chemical attack, road and traffic conditions, air quality, weather conditions, and the like;
providing at least one central knowledge server that receives sensor data developed by said plurality of mobile sensor devices in a periodic transmission from mobile sensor devices over said distributed wireless communication network;
wherein at least one of said plurality of mobile sensor devices is mounted to a vehicle; and
wherein said plurality of mobile sensor devices report said sensor data to said knowledge server via a plurality of wireless local area networks (WLANS) as follows:
a) said plurality of mobile sensor devices handling information determined to be non-crucial information by
i) mapping environmental data with sensor data and storing such in retention memory; and
ii) transmitting said mapped sensor data to the knowledge server via a home based WLAN of the respective mobile sensor device when it returns to its home WLAN; and
b) said plurality of mobile sensor devices handling information determined to be crucial information by
i) mapping environmental data with sensor data and storing such in retention memory; and
ii) transmitting said mapped sensor data to the knowledge server immediately via a first available WLAN to which the respective mobile sensor device connects.

17. A system for monitoring various environmental conditions and situations, the system comprising:
a plurality of mobile sensor devices, each including at least one environmental sensor for detecting external environmental conditions such as potential biological or chemical attack, road and traffic conditions, air quality, weather conditions, and the like, said plurality of mobile sensor devices being mounted to respective sensor carriers deployed in a region of interest and roaming throughout said region of interest; and
a knowledge server in communication with said plurality of mobile sensor devices over a distributed wireless communication network, said knowledge server receiving sensor data developed by said plurality of mobile sensor devices over said distributed wireless communication network;

wherein at least one of said plurality of mobile sensor devices is mounted to a vehicle; and wherein said plurality of mobile sensor devices are configured to report said sensor data to said knowledge server via a plurality of wireless local area networks (WLANS) as follows:

a) said plurality of mobile sensor devices being configured to handle information determined to be non-crucial information by
 i) mapping environmental data with sensor data and storing such in retention memory, and
 ii) transmitting said mapped sensor data to the knowledge server via a home based WLAN of the respective mobile sensor device when it returns to its home WLAN; and b) said plurality of mobile sensor devices being configured to handle information determined to be crucial information by
 i) mapping environmental data with sensor data and storing such in retention memory, and
 ii) transmitting said mapped sensor data to the knowledge server immediately via a first available WLAN to which the respective mobile sensor device connects.

* * * * *